United States Patent [19]

Christensen

[11] Patent Number: 4,790,669
[45] Date of Patent: Dec. 13, 1988

[54] SPECTROSCOPIC METHOD AND APPARATUS FOR OPTICALLY MEASURING TEMPERATURE

[75] Inventor: Douglas A. Christensen, Salt Lake City, Utah

[73] Assignee: CV Technology, Inc., Dallas, Tex.

[21] Appl. No.: 849,435

[22] Filed: Apr. 8, 1986

[51] Int. Cl.$^4$ .............................................. G01J 5/08
[52] U.S. Cl. ...................................... 374/131; 356/44; 356/435
[58] Field of Search ............... 374/161, 162, 131, 129, 374/124; 356/44, 328; 250/339

[56] References Cited

U.S. PATENT DOCUMENTS

| Re. 28,216 | 10/1974 | Barringer et al. | 356/310 |
|---|---|---|---|
| 3,909,132 | 9/1973 | Barrett | 356/43 X |
| 4,136,566 | 1/1979 | Christensen | 374/161 |
| 4,262,198 | 4/1981 | Gupta et al. | 374/161 X |
| 4,355,910 | 10/1982 | Quick et al. | 374/162 |
| 4,409,476 | 10/1983 | Lofgren et al. | 356/44 X |
| 4,459,024 | 7/1984 | Gergely | 250/227 X |
| 4,558,217 | 12/1985 | Alves | 250/227 |
| 4,563,090 | 1/1986 | Witte | 364/498 X |
| 4,669,872 | 6/1987 | Ida | 356/43 |
| 4,669,873 | 6/1987 | Wirz | 356/73 |
| 4,684,252 | 8/1987 | Makiguchi et al. | 356/328 |

OTHER PUBLICATIONS

"A Compact, Concave Grating, Two Spectrum Analyzer... Scattering", by J. LaSalle et al., Optics Communications, vol. 17, No. 3, Jun. 1976; pp. 325–327.

"Fiber-Optic, Semiconductor Temperature Gage", L. B. Johnson Space Center, Houston, Texas, one page, (8/1975), 374-131.

Primary Examiner—Daniel M. Yasich
Attorney, Agent, or Firm—Richards, Harris, Medlock & Andrews

[57] ABSTRACT

Apparatus and method for optically measuring temperature by spectroscopically determining the temperature-induced changes in the wavelength spectrum of light interacting with a semiconductor temperature sensor. The method includes providing illumination from a radiant energy source with a broad wavelength spectrum, guiding the radiant energy to a remote semiconductor sensor, returning the radiant energy after interaction with the semiconductor sensor, and analyzing the returned wavelength spectrum to determine the temperature-induced spectral changes due to the absorption edge of the semiconductor sensor. One embodiment of the invention comprises a quartz-halogen lamp, an optical multiplexer, optical fiber lightguides, a gallium arsenide semiconductor sensor, a fast scan spectrometer, an analog to digital converter and a microprocessor for processing the information of the returned wavelength spectrum for determining and displaying the sensor temperature.

12 Claims, 3 Drawing Sheets

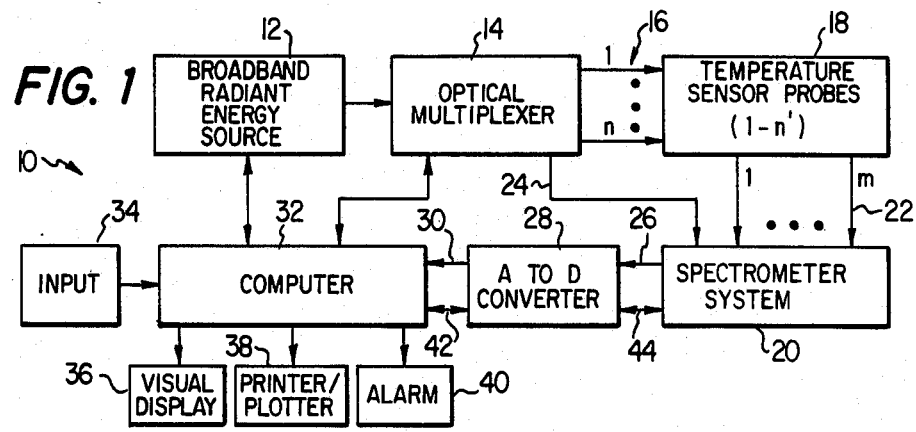
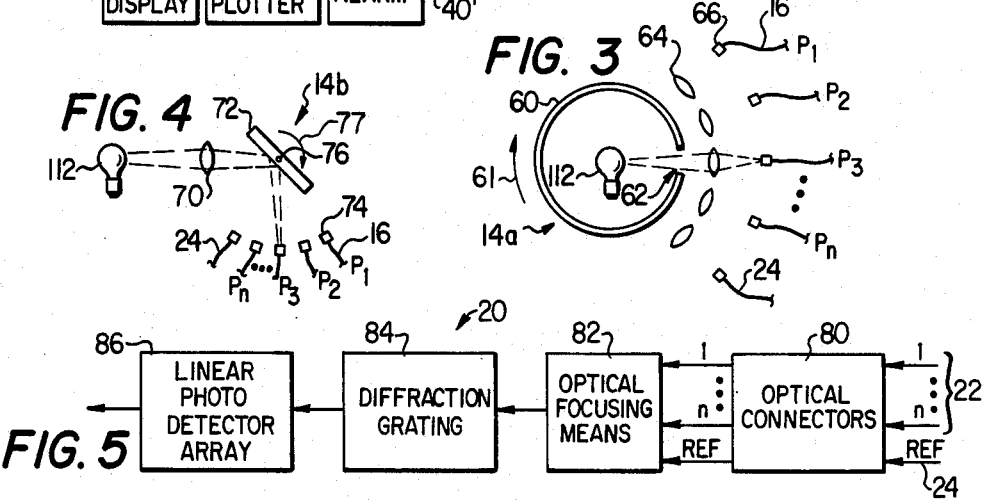
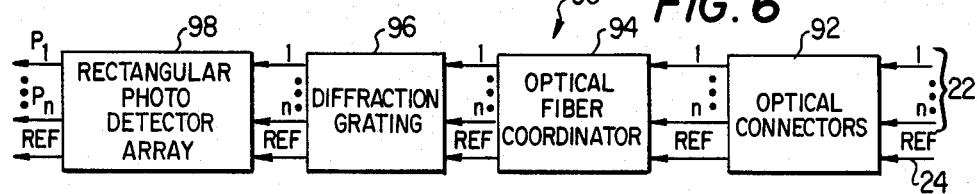

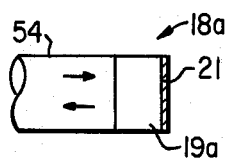
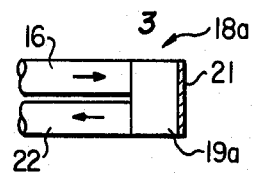
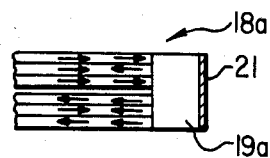
FIG. 9b            FIG. 9a            FIG. 9c
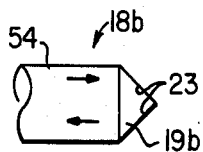
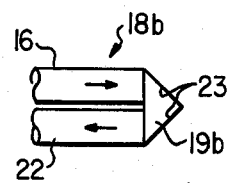
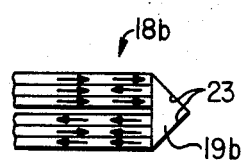
FIG. 10b           FIG. 10a           FIG. 10c
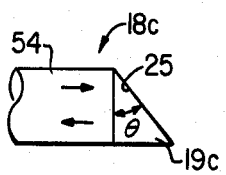
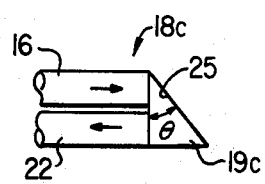
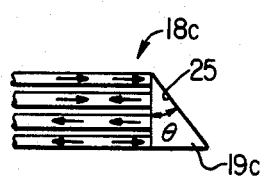
FIG. 11b           FIG. 11a           FIG. 11c
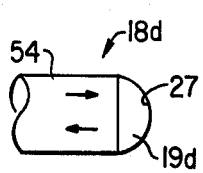
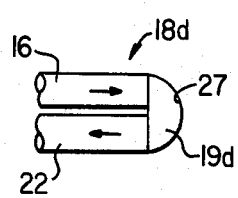
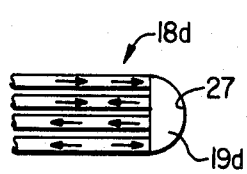
FIG. 12b           FIG. 12a           FIG. 12c
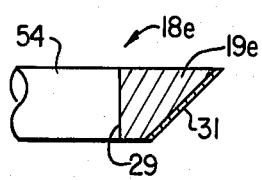
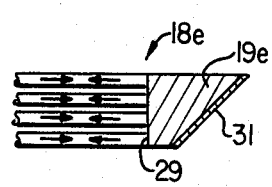
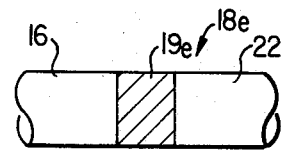
FIG. 13a           FIG. 13b           FIG. 14a
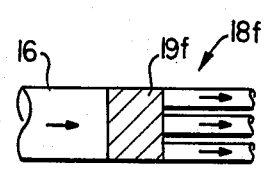
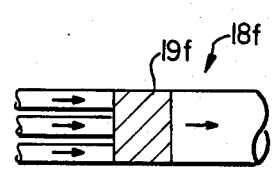
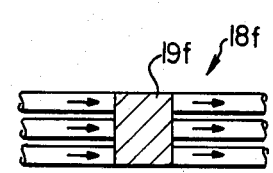
FIG. 14b           FIG. 14c           FIG. 14d

SPECTROSCOPIC METHOD AND APPARATUS FOR OPTICALLY MEASURING TEMPERATURE

TECHNICAL FIELD

This invention relates to temperature sensing and, more particularly, to a method and apparatus for optically measuring temperature by spectroscopically detecting and analyzing temperature-induced changes in the wavelength spectrum of light interacting with semiconducting sensing element.

BACKGROUND OF THE INVENTION

Conventional temperature probes, which utilize thermocouples, thermistors, and other electrically conducting components, are often unusable in the presence of electromagnetic fields because of electrical interference problems and field perturbation effects. Metallic components such as lead wires and connectors can cause erroneous temperature readings in the presence of electromagnetic fields, can pick up electrical interference in electrically noisy environments, and can transmit hazardous electrical shocks in high voltage applications.

Optical temperature probes differ from conventional probes in that they contain essentially no metallic or electrically conducting components. Non-metallic temperature probes have applications in and near regions having electromagnetic fields, such as in microwave ovens, motors, transformers, and electrical generators. In addition, nonmetallic probes preclude the possibility of potentially fatal electrical shocks when used to measure temperature inside the human body.

Because of the advantages of nonmetallic temperature probes, several techniques for optically measuring temperature have been proposed and tested. Among these are methods described in the following articles: C. J. Johnson, et al., "A Prototype Liquid Crystal Fiberoptic Probe for Temperature and Power in R. F. Fields", *Microwave Journal*, Volume 18, No. 8, pp. 55–59, August, 1975; T. Cetas "A Birefringent Crystal Optical Thermometer for Measurements for Electromagnetically Induced Heating, USNC/URSI 1985 Annual Meeting, Boulder, Colo., Oct. 20–23, 1975; D. Christensen, "Temperature Measurement Using Optical Etalons", 1975 Annual Meeting of the Optical Society of America, Houston, Tex., Oct. 15–18, 1975; and "Novel Method for Measuring Transient Surface Temperature with High Spatial and Temporal Resolution", *Journal of Applied Physics*, Vol. 43, No. 7, p. 3213, July, 1972. Other methods which are currently commercially available include the characterization of fluorescent emission from a fluorescent sensor as described in U.S. Pat. Nos. 4,448,547 and 4,459,044; the measurement of discrete wavelength emissions from an excited semiconductor sensor as described in U.S. Pat. Nos. 4,376,890, 4,539,473; the use of a two-wavelength semiconductor sensor as employed by Mitsubishi Corporation; and the use of a narrow band wavelength source whose optical power is variably absorbed by a semiconductor sensor as disclosed by the present inventor in U.S. Pat. No. 4,136,566.

Except for the fluorescent sensor technique, which measures the time history of the emitted optical power, and the etalon technique, which detects a discrete pass band frequency of a reflecting cavity, the prior methods can be classified generally as "amplitude" techniques. In such "amplitude" techniques, the intensity of the return signal is directly proportional to the temperature. Furthermore, all of the prior methods generally utilize only a small portion of the wavelength spectrum, normally measuring the intensity of no more than two wavelengths of the signal or emission.

A major disadvantage of the prior methods for optically measuring the temperature is that the amplitude techniques are susceptible to inaccuracy caused by drift in the source of intensity, variable optical losses in the transmitting fibers, and other intensity variations unrelated to the sensor temperature. These variations can be minimized by taking a ratio of amplitudes of two wavelengths which interact with the sensor, but a unilateral amplitude drift in either component of the ratio still results in temperature measurement errors. Thus, a need has arisen for a nonmetallic temperature measurement device having a higher degree of accuracy and greater stability with respect to time.

SUMMARY OF THE INVENTION

The present invention optically measures the temperature of a semiconductor sensor by spectroscopically determining the wavelength spectrum characteristics of the spectrum of light interacting with a semiconductor sensor. The invention includes a radiant energy source, typically having a broad wave spectrum, transmission by a waveguiding means, such as optical fibers, to an optical temperature sensor, interaction with the temperature sensor, transmission of the temperature-modified spectrum back to a receiver by wave guiding means, and detection of the received spectrum by a spectrometer. Characteristics of the received spectrum are defined by its interaction with the sensor, either by reflection from one or more surfaces of the sensor or after transmission through the sensor. By electrically processing the digital signal information of the received spectrum, the value of the sensor temperature may be obtained.

The invention utilizes the entire wavelength spectrum of the radiant energy which interacts with the semiconductor sensor. The invention can be described as a "spectroscopic" or "wavelength spectrum" technique in that it measures changes in the wavelength spectrum characteristics of the sensor rather than changes in the intensity of the sensor's intersection at one or more discrete wavelengths. The present invention is insensitive to variations and drifts in radiant energy intensity. The wavelength spectrum characteristics of radiant energy transmitted or reflected by the sensor can be determined accurately, for example, by means of a diffraction grating spectrometer coupled with a fastscanning photodiode array. Furthermore, wavelength calibration apparatus is very stable over time, thus eliminating the requirement of frequent recalibration of the system.

The present invention measures temperature by spectroscopically measuring changes in the wavelength spectrum due to the absorption edge of a semiconductor. The rapid increase in the optical absorption of a semiconductor as a function of decreasing wavelength is due to the excitation of the valence band electrons into the conduction band by incident photons which have sufficient energy hf (where "h" is Planck's constant and "f" is the frequency) to bridge the energy gap between the two bands. The energy gap varies monotonically with temperature at a rate characteristic of the semiconductor used as the sensor. Therefore, the wavelength spectrum which describes the absorption edge characteristics (i.e., the non-absorbing region, the initial rise in absorption, the slope, and the plateau at high absorption) will predictably move in wavelength location as the temperature of the sensor changes. The wavelength spectrum of the radiant energy transmitted or reflected by the sensor reveals the form and wavelength location of the absorption edge of the semiconductor, which is indicative of the temperature of the sensor.

In one embodiment of the invention, the source of radiant energy is a broadband quartz-halogen lamp whose total wavelength spectrum of radiant energy is focused onto one or more optical fiber lightguides. The radiant energy passes through the optical fibers to the semiconductor sensor, is transmitted through or reflected by the sensor and collected by one or more receiving optical fibers, and is returned to a spectrometer which determines the wavelength spectrum characteristics of the emitted radiant energy. The spectrometer comprises a diffraction grating, collecting and focusing lenses, and a photodetector array to receive the spectrum from the grating. The diffraction grating and the focusing lenses spread the wavelength of the return signal into a spatial pattern which is detected by the photodetector array. Alternatively, a dispersive optical prism may be used to separate the spectrum instead of a diffraction grating. Also a moving mirror followed by a slit and photodetector may replace the photodetector array. An analog-to-digital converter converts the analog signal to digital signal information relating to the receiving spectrum for processing by a digital computer. The computer utilizes a stored algorithm to process the digitized spectral information returned from the sensor, converting the spectral characteristics of the returned light signal into the temperature at the sensor. The sensor temperature may be output in a number of ways, such as a visual display, recorded on a printer/plotter, or utilized by the computer to activate an audio/visual alarm system.

In order to accomplish fast sequential temperature readings from a plurality of probes and sensors with a common optical source and receiving spectrometer, one embodiment of the invention transmits the light from the optical source through an optical multiplexer to the temperature sensor probes. The optical multiplexer may comprise an array of lenses placed around the light source and a rotating shutter with an aperture sufficient for the light to reach one lens at a time. Each lens has optical fibers placed at the focal point to receive light from the source and transmit it to one of the temperature sensors. The optical energy from the source is thus directed to and collected from only one probe at a time, the sequencing of the probes being achieved by the timing of the rotation of the shutter. In another embodiment of the optical multiplexer, light from the source is focused by a lens onto an oscillating or rotating mirror, which directs the focused beams sequentially to an array of optical fiber ends, each fiber end being associated with one of the temperature sensor probes. Thus, the optical multiplexing systems allows a plurality of temperature sensing probes to be timed-shared with one light source and one spectrometer.

In yet another embodiment to obtain temperature readings from a plurality of temperature sensing probes having an common optical source and receiving spectrometer, the spectrum of light returned from each of the sensors is processed electronically. In this embodiment the need for an optical multiplexer is eliminated. A rectangular array of photodetectors is provided in the spectrometer and each of the ends of the lightguides from the temperature sensors is positioned so that a spectrum of received light is directed or assigned to a separate linear array of photodiodes in the rectangular array. As an example, the X-coordinate of the rectangular array of photodiodes could represent the spectral characteristics of a returned light signal from a sensor and the Y-coordinate could represent an unique address corresponding to each of the individual temperature sensors. This method of using a rectangular array of photodetectors in a fast scan spectrometer and assigning an address to each lightguide provides a means for electronically separating the received spectrum of light from a plurality of temperature sensors in contrast to the mechanical method of separating the light transmitted to each of the temperature sensors with an optical multiplexer.

In one embodiment of the present invention, the digital computer utilizes an algorithm which detects the absorption peak by detecting the wavelength at which the intensity has dropped to one-half the peak intensity anywhere else in the spectrum. Having determined the spectrum position corresponding to one-half the maximum intensity, the computer utilizes a calibration table in memory to convert this information to a temperature reading. The temperature may be output to a visual display, a printer/plotter for recording the temperature, or compared to a predetermined value for activating an alarm.

In another embodiment of the present invention, the computer determines the temperature from the received spectrum by fitting a curve to the spectral edge, such as by utilizing the least squares method. The computer may then convert the curve fitting parameters to the temperature by utilizing the calibration table stored in memory. In addition, the computer may utilize an algorithm to normalize out the reference spectrum, leaving only the spectral change due to the sensor before fitting a curve to the spectral edge of the received spectrum.

A BRIEF DESCRIPTION OF THE DRAWINGS

For a more complete understanding of the present invention and for further advantages thereof, reference is now made to the following Description of the Preferred Embodiments taken in conjunction with the accompanying Drawings, in which:

FIG. 1 is a functional block diagram of one embodiment of the present invention, wherein light is transmitted and received unidirectionally along fiber optic lightguides to the sensor;

FIG. 2 is a functional block diagram of another embodiment of the present invention, wherein light is transmitted and received bidirectionally along fiber optic lightguides to the sensor;

FIG. 3 illustrates one embodiment of an optical multiplexer for use in the present invention;

FIG. 4 illustrates a second embodiment of an optical multiplexer for use in the present invention;

FIG. 5 illustrates one embodiment of a fast scan spectrometer system for use in a system incorporating the present invention such as shown in FIGS. 1 and 2;

FIG. 6 illustrates an embodiment of a fast scan spectrometer system for use in one embodiment of a system incorporating the present invention, wherein the received spectrum of light for a plurality of temperature sensor probes is separated electronically;

Figure 15:
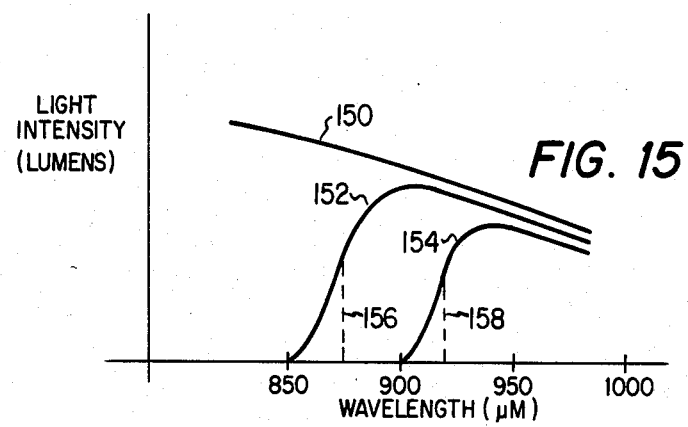

FIGS. 9a–c illustrate variations of one embodiment of a semiconductor sensor of the present invention;

FIGS. 10a–c illustrate variations of one embodiment of a semiconductor sensor of the present invention;

FIGS. 11a–c illustrate variations of one embodiment of a semiconductor sensor of the present invention;

FIGS. 12a–c illustrate variations of one embodiment of a semiconductor sensor of the present invention;

FIGS. 13a–b illustrate variations of one embodiment of a semiconductor sensor of the present invention;

FIGS. 14a–d illustrate variations of one embodiment of a semiconductor sensor of the present invention; and FIG. 15 is a graph illustrating the temperature-induced wavelength spectrum change of the absorption edge of a semiconductor sensor of the present invention.

DESCRIPTION OF THE PREFERRED EMBODIMENTS

FIG. 1 is a block diagram of a system 10 illustrating one embodiment of the present invention for optically measuring temperature. A broadband radiant energy source 12, such as a quartz-halogen lamp 112 (see FIGS. 3 and 4), provides illumination for the temperature measuring system 10. The radiant energy source 12 will provide illumination for a single semiconductor temperature sensor, or the source 12 may be time-shared among a plurality of semiconductor temperature sensors by utilizing an optical multiplexer 14 of the type described below in FIGS. 3 and 4. In another embodiment of the invention shown in FIG. 6, means are provided for electronically separating the illumination received from temperature sensor probes which are continuously illuminated by the radiant energy source 12, eliminating the need for an optical multiplexor.

A number of "n" optical fiber light guide(s) 16 (1−n) transmit radiant energy from radiant energy source 12 to a number of n' temperature sensor probe(s) 18 (1−n').

Lightguides 16 may be coupled to the source 12 through multiplexer 14 when more than one sensor probe 18 is used.

A fast scan spectrometer system 20 detects the wavelength spectrum characteristics of the light transmitted from temperature sensor probes 18 through a number of "m" lightguides 22 (1−m). One example of a commercially available spectrometer that may be utilized as spectrometer 20 is manufactured by Spectron Instrument and identified as Model CE395. The number of lightguides 22 from the temperature sensor probes 18 may differ from the number of lightguides 16 to the probes 18, as illustrated in FIGS. 9–14.

The spectrometer system 20 may also have a lightguide 24 connecting it to the radiant energy source 12 through multiplexer 14 to provide a reference signal of the wavelength spectrum of the source 12. This reference signal may be used to monitor the condition of the light source, the light source spectrum and to calibrate the photodetector array on a continuous basis. However, the reference signal transmitted from the energy signal 12 through the lightguide 24 is not necessary to the operation of the invention.

An analog signal from spectrometer 20 is transmitted through a line 26 to an analog-to-digital (A to D) converter 28 for converting it to a digital signal representing the received light spectrum. The digitized signal is transmitted over a line 30 to a computer 32 for electronic signal processing. Computer 32 is controlled through input means 34. The computer 32 also is connected to the radiant energy source 12 and optical multiplexer 14 for operating and controlling their functions. Computer 32 includes a memory means for storing parameters for use in accordance with one of the algorithms shown in FIGS. 7 and 8 for calculating the sensor temperature. In addition, memory means of computer may be utilized to store predetermined temperature limits set through input means 34 to allow the computer 32 to determine when the temperature of probe 18 exceeds the predetermined value. The computer 32 of the present invention may be implemented with any one of a number of microprocessors and associated memory means commercially available as plug in modules, such as plug in modules built around the Motorola 68000 series microprocessor or the Intel 8086 microprocessor.

The computer 32 may output the calculated sensor temperature to a visual display 36 or a printer/plotter 38 for recording temperature data. An audio/visual alarm of 40 may also be provided to enable the computer to determine when the sensor temperature exceeds a predetermined value and providing an alarm to alert an operator that the temperature has exceeded some predetermined range of temperatures.

A clock pulse is transmitted from computer 32 over control/clock signal line 42 to A to D converter 28 and line 44 to clock the spectrometer 20. The spectrometer 20 also transmits a control signal back to the computer over lines 42 and 44 and through converter 28 to signal when the spectrometer 20 is through scanning the received signals from the probe 18.

FIG. 2 illustrates an alternate embodiment of a system 50 of the present invention for optically measuring temperature. The elements of the system 50 which are identical to the system 10 described in FIG. 1 are designated with the same reference numerals having a "'" designation added. These elements in system 50 common to those in System 10 will not be described in connection with FIG. 2, as is understood that they function in a similar manner described above in the description of system 10.

The temperature measuring system 50 includes a fiber directional coupler 52 for processing light transmitted bidirectionally to a plurality of "n" lightguides 54 for temperature sensor probes 18'. In addition, the fiber directional coupler 52 enables light to be transmitted from the temperature sensor probes 18' unidirectionally to a plurality of "m" lightguides 22'. Instead of a fiber direction coupler 52, it is to be understood that a beam splitter and collimating lenses may be used.

FIG. 3 illustrates one embodiment of an optical multiplexer 14a for use in the present invention. A rotating shutter 60, rotating as shown by directional arrow 61, has an aperture 62 for allowing the time-sequenced illumination of a plurality of probes from the same light source, a quartz-halogen lamp 112. As described in connection with FIG. 1, the computer 32 may be programmed to control both the lamp 112, including its intensity, and the optical multiplexer 14a, including timing the illumination from lamp 112. Light from lamp 112 is allowed to pass on a time-sequenced basis through aperture 62 to an array of lenses 64 focusing the light to a plurality of focal points 66 located at the ends of lightguides 16. In addition, the optical multiplexer 14 allows light from lamp 112 to be transmitted to the reference lightguide 24 for providing a reference signal to the spectrometer 20 (FIG. 1).

FIG. 4 is an alternate embodiment of an optical multiplexer 14b. Light from the quartz halogen lamp 112 is focused by a lens 70 onto a mirror 72 which reflects the light to an array of focal points 74. The mirror 72 rotates about an axis 76, as shown by directional arrow 77, so as to direct the light from lamp 112 on a time sequenced basis to the plurality of "n" lightguides 16. In addition, light is transmitted on a time-sequenced basis through a lightguide 24 as a reference signal to spectrometer 20 (FIG. 1).

FIG. 5 illustrates one embodiment of the spectrometer system 20 shown in FIGS. 1 and 2. The plurality of lightguides 22 from the temperature sensors 18 enter the spectrometer system 20 through optical connectors 80, or it is understood that the lightguides may be connected directly to the spectrometer system 20. Reference lightguide 24 also may be connected with the spectrometer system 20 through optical connectors 80. The referenced lightguide 24 provides an optical reference spectrum. The optical connectors 80 direct the light from lightguides 22 and 24 to an optical focusing means 82, such as a system of lenses, to direct one of the time-sequenced illuminated lightguides 22, 24 to an optical spectral separator, such as diffraction grating 84, for separating the light into its wavelength spectrum. The optical spectral separator may be implemented by means of a diffraction grating 84 or a dispersive optical prism (not shown) to spread the spectrum of the returned light signal into corresponding angles. The received wavelength spectrum from diffraction grating 84 is transmitted to a photodetector array 86 having a linear array of photodiodes for measuring the wavelength characteristics of the received light signal. The photodetector array 86 of spectrometer system 20 senses the temperature-induced wavelength spectrum shift of the absorption edge of the semiconductor sensor and the temperature sensor probe 18. The analog signal representative of the temperature-induced wavelength spectrum shift is then converted to a digital signal through A to D converter 28 and processed through the algorithm of computer 32 to determine the temperature.

In another embodiment of the spectrometer 20, the photodetector array 86 may be replaced by a rotating mirror which projects the spectrum through a pin hole or slit onto a single, stationary photodetector. While such a spectrometer would have slower processing speed, it would have the advantage of lower noise or a higher signal to noise ratio.

FIG. 6 illustrates an alternate embodiment of a spectrometer system 90 for use in a system similar to that illustrated in FIGS. 1 and 2 but in which the optical multiplexer 14 may be eliminated. The spectrometer system 90 provides means for electronically reading each of the returned light signals from the plurality of temperature sensors 18 that are receiving a continuous transmission of light from the broadband energy source 12. The spectrometer system 90 includes optical connectors 92 for providing connections to the lightguides 22 from probes 18 and the reference lightguide 24 from the radiant energy source 12. Optical fiber coordinator 94 provides a vertical or lateral displacement of the lightguides 22, 24 wherein each return fiber or reference fiber is assigned a different address along one axis (x or y) in a coordinate system. For purposes of this description, the lightguides 22, 24 are assigned different positions along the y-axis.

An optical spectral separator, such as diffraction grating 96, separates the light from each of the lightguides 22, 24 into its wavelength spectrum along the x-axis of a rectangular photodetector array 98. Each lightguide 22 from the temperature sensor probes, as well as the referenced light guide 24, have a different vertical address along the y-axis assigned by the optical fiber coordinator 94. A wavelength spectrum associated with that lightguide is spread out along a horizontal row, or x-axis, of the rectangular array (x,y) of photodetectors in array 98. The received spectrum from each single lightguide appears as a horizontal line of intensity upon the horizontal x-axis of the photodetector array 98. The wavelength spectrum information for each of the probes 18 is transmitted from the rectangular array photodetector 98 for all of the illuminated lightguides 22, 24 to be processed by computer 32.

Figure 7:
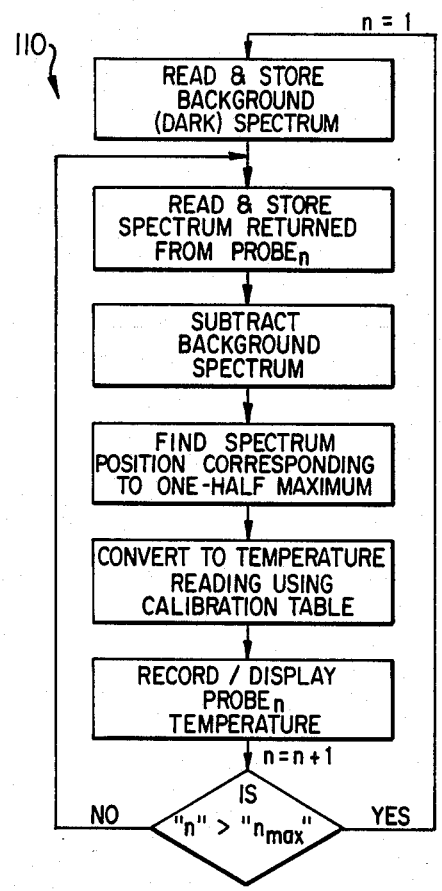
FIG. 7 is a flow chart of an algorithm for determining the probe temperature utilizing the present invention.

FIG. 7 illustrates a flow chart 110 for the computer 32 to process information received from spectrometer 20 or spectrometer 90. If the spectrometer 90 produces probe by probe information in a parallel fashion, then a buffer would be used by computer 32 in order to serially process this information. The spectrometer 90 may utilize a rectangular array 98 that produces probe information in a serial fashion. The flow chart 110 describes a method of detecting the absorption peak of the semiconductor sensor by detecting the wavelength at which the intensity of light has dropped to one-half of the peak intensity anywhere else in the received spectrum of light. Following the process steps for the flow chart 110, the computer 32 first causes the background (dark) spectrum to be read and stored. The return spectrum from probe "n" is read and stored, and the background spectrum is subtracted from the returned spectrum. The position on the spectrum corresponding to one-half the maximum value is found, and the computer 32 converts this position to a temperature reading using a calibration table in memory. The temperature of the probe is then recorded or displayed through visual display 36 or printer/plotter 38 (FIG. 1). The computer next increments a probe counter by the equation $n = n + 1$. A comparison is made to determine if the probe number (n) in the counter is now greater than the preset number for the maximum number of probes ($n_{max}$). If all probes "n" in the system have not processed, the program returns to read and store the spectrum from the next probe. If all probes have been processed, or "n" is greater than "$n_{max}$", the program returns to the initial step and the probe counter is reset by making $n = 1$. The background (dark) of spectrum is read at the beginning of each cycle as it may change with time.

Figure 8:
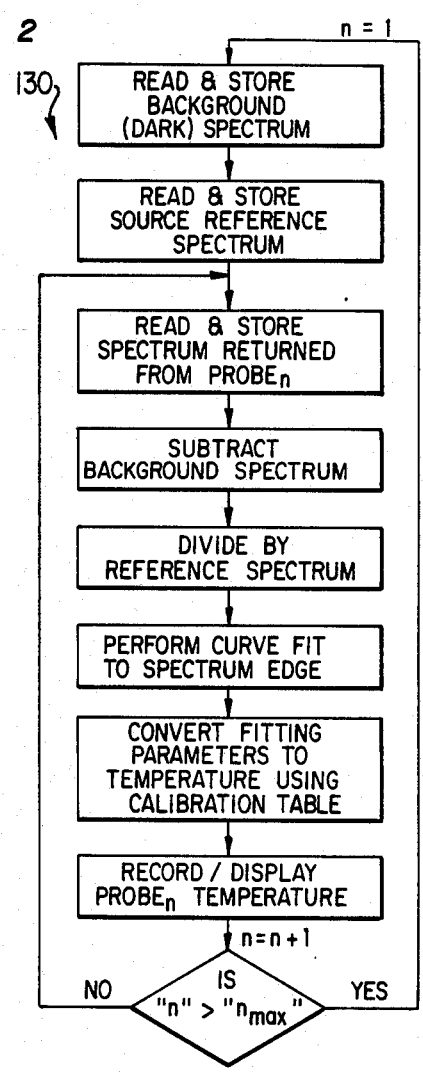
FIG. 8 is a flow chart of a second algorithm for determining the probe temperature utilizing the present invention.

FIG. 8 illustrates a flow chart 130 as an alternate method for computer 32 to calculate the temperature serially from a plurality of "n" probes 18. The method of flow chart 130 differs from that in flow chart 110 in two respects. First, the reference spectrum of the radiant energy source 12 is normalized out. Second, a curve fit is performed to the spectral edge so that all of the data points are used, not just the position of the spectrum.

The method shown in the flow chart 130 begins by reading and storing the background (dark) spectrum and reading and storing the source reference spectrum. The return spectrum from the first program is then read and stored, and the background spectrum is subtracted from it. The resultant spectrum is divided by the reference spectrum to normalize out the source spectrum, leaving only the spectral change due to the temperature of the semiconductor sensor. A curve fitting is done for the spectral edge, thereby utilizing the data from all of the photodetectors. Standard curves for the sensor are determined experimentally and placed in the mathematical computer's 32 memory, or it is to be understood that a plurality of descriptors may be stored for every probe. Next, the computer 32 performs a least squares method, or similar method, to determine the curve shape that minimizes the square of the difference between the calculated curve and the experimental curve. The resulting curve fitting parameters are used with a calibration table in memory to determine the temperature.

The calibrated temperature of probe "n" is then recorded or displayed through visual display 36 or printer/plotter 38. Though not illustrated, it is to be understood that the flow chart 130 may include an additional step of comparing the calculated temperature to a predetermined limiting temperature to cause a signal to be sent to the audio/visual alarm 40. In this way, an operator may be alerted that temperature conditions have exceeded the predetermined limits.

A counter containing the probe count is next incremented by the equation $n=n+1$. The value of the updated probe counter "n" is compared to "$n_{max}$", the preset value of the number of probes used in the system. If "n" is not greater than "$n_{max}$", the program is returned to read and store the spectrum from the next probe "n".

If the temperature of all probes in the system have been calculated, the program returns to the initial step of reading and storing the background (dark) spectrum and the source reference spectrum.

FIG. 9(a) illustrates an embodiment of sensor probe 18 wherein light transmitted by lightguide 16 enters semiconductor sensor 19a, is reflected by a surface 21, and is transmitted by lightguide 22 to spectrometer 20. FIG. 9(b) illustrates a sensor probe 18a wherein light transmitted by lightguide 54 enters sensor 19a, is reflected by a surface 21, is transmitted bidirectionally along the same lightguide 54 to the fiber directional coupler 52 for transmission through lightguides 22' to spectrometer 20'. FIG. 9(c) illustrates a combination of multiple fibers in which light is transmitted and returned unidirectionally and bidirectionally for the same probe.

The light reflecting surface 21 is a coated, plated or sputtered thin layer of suitable metal with broadband "ideal" light reflecting properties. In addition, all external surfaces of the semiconductor sensor 19a may be coated with metal in order to prevent "a moisture effect." In addition to its light reflection properties, the surface 21 provides optical isolation of sensor 18a from the external environment.

FIG. 10(a) illustrates another embodiment of temperature sensor probe 18a wherein light transmitted by a lightguide 16 enters a semiconductor sensor 19b having a triangular cross section. Internal reflective surfaces 23 returns the reflected light through lightguide 22 to spectrometer 20. FIG. 10(b) illustrates a sensor probe wherein a single lightguide 54 transmits light to semiconductor sensor 19 having a triangular cross section with internal reflective surfaces 23, and light is returned bidirectionally through the same lightguide 54. FIG. 10(c) illustrates a sensor probe 18b having a combination of lightguides for the unidirectional and bidirectional transmission and return of light to semiconductor sensor 19b. Semiconductor sensor 19b may include a metal coating 21 for the reasons described above in connection with the probe described in FIG. 9. FIGS. 11(a)-(c) illustrate an alternate embodiment of semiconductor sensor probe 18c in which the semiconductor sensor 19c has an internal reflective surface 25 at an acute angle "$\theta$" to the surface of the lightguide. In FIG. 11(a) light is transmitted by lightguide 16, enters semiconductor sensor 19c and is reflected by surface 25 of the sensor 19c and returned by lightguide 22 to the spectrometer 20. In FIG. 11(b), light is transmitted bidirectionally through a lightguide 54 to the semiconductor sensor 19c and returned by reflective surface 25 along the same lightguide 54. FIG. 11(c) illustrates an embodiment of sensor 18c having a combination of lightguides for unidirectionally and bidirectionally transmitting and receiving light to semiconductor sensor 19c.

FIG. 12(a) illustrates an embodiment of temperature sensor 18d wherein the semiconductor sensor 19d has a curved reflective surface 27 for returning light transmitted to the sensor 19d. In FIG. 12(a), light is transmitted by a lightguide 16 to the semiconductor sensor 19d and is returned by reflective surface 27 through lightguide 22 to spectrometer 20. In FIG. 12(b), light is transmitted bidirectionally through a lightguide 54 to enter sensor 19d and returned from reflective surface 27 through the same lightguide 54. In FIG. 12(c), sensor 19d shows a combination of unidirectional and bidirectional lightguides for transmitting and receiving light to and from semiconductor sensor 19d.

In FIG. 13(a), an embodiment of temperature sensor probe 18e is illustrated utilizing a single fiber lightguide 54, wherein the light is reflected directly by a surface 29 of the sensor 19e contacting the lightguide 54. The surface of sensor 19e distal the lightguide comprises an optical absorber 31 to prevent spurious reflections from the interior sensor 19e. The light directly reflected by the surface 29 of sensor 19e has temperature-induced characteristics similar to those of light transmitted by sensor 19e after penetration, as described above and illustrated in FIGS. 9, 10, 11, and 12. Due to the band edge absorption taking place in the semiconductor sensor, its complex index of refraction exhibits a wavelength dependent characteristic. Therefore, the reflection that occurs at the surface 27 due to the mismatch of the indices of refraction between the lightguide 22 and sensor 19e will exhibit this same wavelength dependence. FIG. 13(b) shows a temperature sensor 18e having a semiconductor sensor 19e for reflection of the transmitted light at the fiber/sensor interface 29 described in FIG. 13(a). However in FIG. 13(b), a combination of unidirectional and bidirectional fibers connect the source and spectrometer to the temperature probe 18e.

FIGS. 14(a)-(d) illustrate embodiments of temperature probe 18p wherein the light transmitted to semiconductor sensor 19p passes directly through it and into a lightguide(s) leading to the spectrometer 20. In FIG. 14(a), light is transmitted from lightguide 16 through semiconductor sensor 19p and returned by a lightguide 22 to spectrometer 20. In FIG. 14(b), light is transmitted from a lightguide 16 to a semiconductor sensor 19p. FIGS. 14(b), (c) and (d) illustrate that the temperature probe 18p in which light is transmitted directly through the semiconductor sensor 19p may comprise either single lightguide transmission means to the sensor 19p and multiple lightguides returned to the spectrometer, a plurality of lightguides transmitting light to the sensor 19p and a single lightguide returning from sensor 19p to the spectrometer, or a plurality of lightguides transmitting light to sensor 19*p* and a plurality of lightguides returning from sensor 19*p* to the spectrometer 20.

FIG. 15 illustrates the relationship between the wavelength characteristics of the absorption edge of sensor 19 and its temperature. Curve 150 shows the broadband reference spectrum of light emitted by radiant energy source 12 and transmitted through the reference lightguide 24. Curve 152 shows the spectrum of the light from the radiant energy source 12 after passing through a gallium arsenide semiconductor sensor at a temperature of 25° C. Curve 154 shows a spectrum of light from energy source 12 after passing through the same gallium arsenide sensor at a temperature of 100° C. Curves 152 and 154 depict the absorption of the sensor at temperatures of 25° C. and 100° C., respectively.

The absorption edge of the sensor's spectral curves 152, 154 may be defined as the wavelength 156, 158 at which the intensity of the spectrum is some fraction, such as one-half, of the intensity of the reference spectrum 150, or some fraction of the maximum intensity in the transmitted or reflected portion of the spectrum from the sensor. More generally, the return spectrum shaped characteristics may be compared to the spectral shape of a reference or calibration spectrum stored in the memory of the computer 32 in order to determine the temperature-induced changes in the spectrum from the sensor 19. The absorption edge thus defined in not affected by variations in the intensity of the radiation from energy source 12. The computer 32 calculates the temperature of sensor 19 by correlating the wavelength 156, 158 with predetermined temperature characteristics of that particular semiconductor material for sensor 19.

Whereas the present invention has been described with respect to specific embodiments thereof, it should be understood that various changes and modifications may be suggested to one skilled in the art, and is intended in this disclosure to encompass such changes and modifications as fall within the scope of the appended claims.

I claim:

1. An apparatus for measuring temperature, comprising:

a radiant energy source with a broad wavelength spectrum;

semiconductor temperature sensors for receiving radiant energy from said source including means for transmitting or reflecting radiant energy;

means for determining wavelength spectrum characteristics of the radiant energy transmitted or reflected from said sensors;

waveguide means for receiving radiant energy from said source and optically coupled to said sensors and said wavelength spectrum determining means for transmitting radiant energy from said source to said sensors and for transmitting said energy transmitted or reflected from said sensors to said determining means;

electronic digital signal processing means for deriving the value of the temperature of said sensors from said determined wavelength spectrum characteristics; and radiant energy multiplexer means optically coupled between said source and said said sensors, for sequentially transmitting radiant energy from said source to said sensors.

2. An apparatus for measuring temperature, comprising:

a radiant energy source with a broad wavelength spectrum;

semiconductor temperature sensors for receiving radiant energy from said source and including means for transmitting or reflecting radiant energy;

means for determining wavelength spectrum characteristics of the radiant energy transmitted or reflected from said sensors;

waveguide means for receiving radiant energy from said source and optically coupled to said sensors and said wavelength spectrum determining means for transmitting radiant energy from said source to said sensor and for transmitting said energy transmitted or reflected from said sensor to said determining means;

electronic digital signal processing means for deriving the value of the temperature of said sensor from said determined wavelength spectrum characteristics.

radiant energy multiplexer means including an array of lenses disposed around said source, and a rotating shutter disposed between said source and said array of lenses, said shutter having an aperture which allows radiant energy from said source to reach only one lens of said array at a time, said radiant energy reaching each lens of said array sequentially as said shutter rotates around said source; and p1 said waveguide means including a waveguide located at the focal point of each lens to receive and transmit said radiant energy.

3. An apparatus for measuring temperature, comprising:

a radiant energy source with a broad wavelength spectrum;

semiconductor temperature sensors for receiving radiant energy from said source and including means for transmitting or reflecting radiant energy;

means for determining wavelength spectrum characteristics of the radiant energy transmitted or reflected from said sensors;

waveguide means for receiving radiant energy from said source and optically coupled to said sensors and said wavelength spectrum determining means for transmitting radiant energy from said source to said sensor and for transmitting said energy transmitted or received from said sensor to said determining means;

electronic digital signal processing means for deriving the value of the temperature of said sensor from said determined wavelength spectrum characteristics; and radiant energy multiplexer means including: a movable mirror, a lens disposed between said source and said mirror to focus said radiant energy onto said, and means to move said mirror to direct said focused radiant energy sequentially to each of said sensors through said waveguide means.

4. An apparatus for optically measuring temperature, comprising:

an optical light source with a broad wavelength spectrum;

a plurality of semiconductor sensors remote from said light source, each of said sensors having a light absorption edge wavelength which is characteristic of said semiconductor sensor and variable as a function of temperature;

a light detecting means comprising a diffraction grating and a photodetector array for detecting wavelength spectrum changes in the light absorption edge of said sensors;

an optical multiplexer for receiving light from said light source for time-sharing said light source among said sensors;

optical fiber lightguide means coupled to said multiplexer, said sensors, and said detecting means for transmitting light from said multiplexer to said sensors and for transmitting light from said sensors to said detecting means;

electronic digital signal processing means optically coupled by said lightguide means to said detecting means for deriving the value of the temperature of each of said sensors responsive to changes in said wavelength spectrum characteristics of said semiconductor sensors; and means for displaying said derived temperatures, whereby temperature is measured optically by an apparatus that is insensitive to drifts and variations in the source of radiant energy.

5. The method of measuring temperature, comprising the steps of:

providing radiant energy from a radiant energy source with a broad wavelength spectrum;

guiding said radiant energy through a fiber lightguide means to a remote semicondcutor sensor directly attached to said lightguide means, said sensor having a radiant energy absorption edge;

optically collecting the radiant energy emitted from said sensor by said fiber lightguide means;

determining the wavelength spectrum characteristics of the emitted radiant energy due to the absorption edge of said semiconductor sensor in analog form;

digitizing said analog determination of the wavelength spectrum characteristics, and processing said digitized wavelength spectrum characteristics collected from said sensor in an electronic digital signal processor to derive the value of the temperature of said sensor.

6. The method of claim 5, further comprising the step of providing a display of the temperature of said sensor.

7. The method of claim 5, further comprising the step of providing a radiant energy multiplexer for time sharing said radiant energy source among a plurality of sensors.

8. The method of claim 5, wherein said radiant energy source is a quartz-halogen lamp and said sensors are fabricated from a semiconductor material.

9. The method of claim 8, wherein said wavelength shift is measured by an optical spectrometer having a diffraction grating and a photodetector array.

10. The method of measuring temperature of claim 5, wherein said processing of said wavelength spectrum characteristics comprises:

determining the wavelength spectrum position at which the intensity has dropped to one-half the peak intensity of the spectrum;

storing in memory means connected to said processor a table calibrating the temperature to the wavelength position at which the intensity is one-half the peak intensity of the wavelength spectrum; and calculating the value of the temperature at said sensor by using said calibration table to convert the determined one-half peak in intensity wavelength position to temperature.

11. The method of measuring temperature of claim 5, wherein said processing of said wavelength spectrum comprises:

normalizing out the reference spectrum of the radiant energy source;

storing in memory means connected to said processor standard experimental curves predetermined for said semiconductor sensor;

performing a curve fitting for the spectral edge of the said emitted radiant energy from said sensor to said stored standard experimental curves for said semiconductor sensor to determine curve fitting parameters;

storing in memory means connected to said processor a calibration table to convert curve fitting parameters to a corresponding temperature for said semiconductor sensor; and calculating the value of the temperature of said sensor by using said calibration table to convert the determined curve fitting parameters to temperature.

12. The method of measuring temperature of claim 5 and further comprising:

storing a predetermined limiting temperature in memory means connected to said processor;

comparing the derived temperature value with said stored limiting temperature; and generating an alarm signal in response to said derived temperature exceeding said limiting temperature.

* * * * *

UNITED STATES PATENT AND TRADEMARK OFFICE
CERTIFICATE OF CORRECTION

PATENT NO. : 4,790,669

DATED : Dec. 13, 1988

INVENTOR(S) : Douglas A. Christensen

It is certified that error appears in the above-identified patent and that said Letters Patent is hereby corrected as shown below:

```
Column 1, line 10, after the word "with" insert the word --a--;
Column 2, line 44, change "intersection" to --interaction--.
Column 3, line 30, change "receiving" to --received--;
          line 64, change "an" to --a--.
Column 6, line 39, change "numerals" to --numeral--;
          line 61, after the word "the" insert the words --quartz halogen--.
Column 7, line 8, change "time sequenced" to --time-sequenced--.

Column 9, line 56, change "18a" to --18b--.
Column 10, line 55, change "18p" to --18f--;
           line 56, change "19p" to --19f--;
           line 59, change "19p" to --19f--;
           line 61, change "19p" to --19f--;
           line 63, change "18p" to --18f--;
           line 64, change "19p" to --19f--;
           line 65, change "19p" to --19f--;
           line 68, change "19p" to --19f--;
           line 68, change "19p" to --19f--.
Column 11, line 3, change "19p" to --19f--.

Column 12, line 30, delete "p1";
           line 57, change "said," to --said mirror,--.
```

Signed and Sealed this

Thirteenth Day of June, 1989

*Attest:*

DONALD J. QUIGG

*Attesting Officer*      *Commissioner of Patents and Trademarks*